United States Patent [19]
Vickers et al.

[11] Patent Number: 5,544,873
[45] Date of Patent: Aug. 13, 1996

[54] APPARATUS TO HOLD COMPRESSOR OR TURBINE BLADE DURING MANUFACTURE

[75] Inventors: Thomas E. Vickers, Mesa; James A. Sanger, Prescott, both of Ariz.

[73] Assignee: AlliedSignal Inc., Morris Township, N.J.

[21] Appl. No.: 959,893

[22] Filed: Oct. 13, 1992

Related U.S. Application Data

[62] Division of Ser. No. 812,776, Dec. 23, 1991, Pat. No. 5,191,711.

[51] Int. Cl.$^6$ ............................................. B23P 1/00
[52] U.S. Cl. ........................ 269/47; 269/909; 29/889.21; 29/889.22; 29/559
[58] Field of Search .................................. 269/43, 47, 52, 269/909, 266, 274, 275; 409/131, 132; 82/1.11; 29/889.21, 889.22, 559

[56]       References Cited

U.S. PATENT DOCUMENTS

| | | | |
|---|---|---|---|
| 2,428,674 | 10/1947 | Miller et al. | |
| 2,565,925 | 8/1951 | Lombard | 409/131 |
| 2,730,794 | 1/1956 | Schorner | 29/889.2 |
| 4,009,874 | 3/1977 | Hughy | 269/909 |
| 4,164,102 | 8/1979 | Lohrun et al. | 29/889.21 |
| 4,202,084 | 5/1980 | Piguet | 29/889.2 |
| 4,266,454 | 5/1981 | Mitchell et al. | 82/1.11 |
| 4,449,703 | 5/1984 | Robinson | 269/909 |
| 4,501,095 | 2/1985 | Drinkuth | 29/889.21 |
| 4,884,951 | 12/1989 | Meylan et al. | 29/889.21 |

*Primary Examiner*—Irene Cuda
*Attorney, Agent, or Firm*—James W. McFarland

[57]       ABSTRACT

A turbine or compressor blade holding fixture and machining method contemplates the subassembly of all the blades upon the rotor of the compressor or turbine. Fixture rings along with radial biasing members in the form of annular o-rings are intersecured to opposite sides of the blades so as to radially position the latter in their normal "running position" while so mounted on the rotor of the wheel. In such condition all of the blades may be simultaneously machined such that the outer tips thereof lie on a true uniform, desired outer diameter to provide subsequently uniform tip clearance to the surrounding shroud when mounted in a gas turbine engine for operation.

4 Claims, 2 Drawing Sheets

APPARATUS TO HOLD COMPRESSOR OR TURBINE BLADE DURING MANUFACTURE

This is a division of application Ser. No. 07/812,776, filed Dec. 23, 1991, now U.S. Pat. No. 5,191,711.

TECHNICAL FIELD

This invention pertains to improved apparatus and method for manufacturing compressor and turbine wheels as utilized in gas turbomachinery.

BACKGROUND OF THE INVENTION

One class of compressor or turbine wheels, such as utilized in gas turbine engines, includes a plurality of compressor or turbine blades mounted to the outer periphery of a central rotor. It is important in gas turbomachinery that the outer tips of the compressor or turbine blades run very closely to surrounding shrouds to minimize gas leakage across the tips of the blades. Machining of such turbine or compressor blade tips to the desired outer true tip diameter is a difficult manufacturing operation because the blades are normally contained with root portions loosely fitting within dovetail grooves in the rotor at the periphery thereof. Compensation for manufacturing tolerance buildup also hampers manufacture of such a compressor or turbine wheel to assure all blade tips are disposed at a uniform, small tolerance from the surrounding outer shroud.

SUMMARY OF THE INVENTION

Accordingly, an important object of the present invention is to provide an improved method for machining such compressor or turbine blade outer tips while the turbine blades are all mounted within the associated rotor and affixed at locations simulating their running position when subsequently assembled and utilized in a gas turbine engine.

More particularly, the present invention contemplates such a method which includes an assembly fixture that engages each of the turbine blades and uniformly radially biases each radially outwardly to their normal "running" position, i.e. the position they attain while operating in a gas turbine engine. The fixture holds the blades in such location with sufficient force to allow machining of the tips of all the blades in a unitary operation. More particularly, the method contemplates mounting the assembled rotor and blades along with the holding fixtures on to a lathe for uniform, simultaneous cutting of the blade tips to the desired outer diameter.

The present invention accomplishes these objects by utilizing a pair of ring fixtures mounted at opposite sides of the wheel rotor and axially intersecured to one another. Resilient biasing members between each of the rotors and an exposed, underside portion of the platform of each of the blades urges the blades outwardly into the "running" position. Additionally, an axial biasing member may be included to urge the blades each uniformly axially onto a datum face for simulating the axial location of all the blades in their "running" position.

These and other objects and advantages of the present invention are specifically set forth in or will become apparent from the following detailed description of the preferred embodiment of the invention, when read in conjunction with the accompanying drawings.

BRIEF DESCRIPTIONS OF THE DRAWINGS

DETAILED DESCRIPTION OF THE PREFERRED EMBODIMENT

Figure 1:
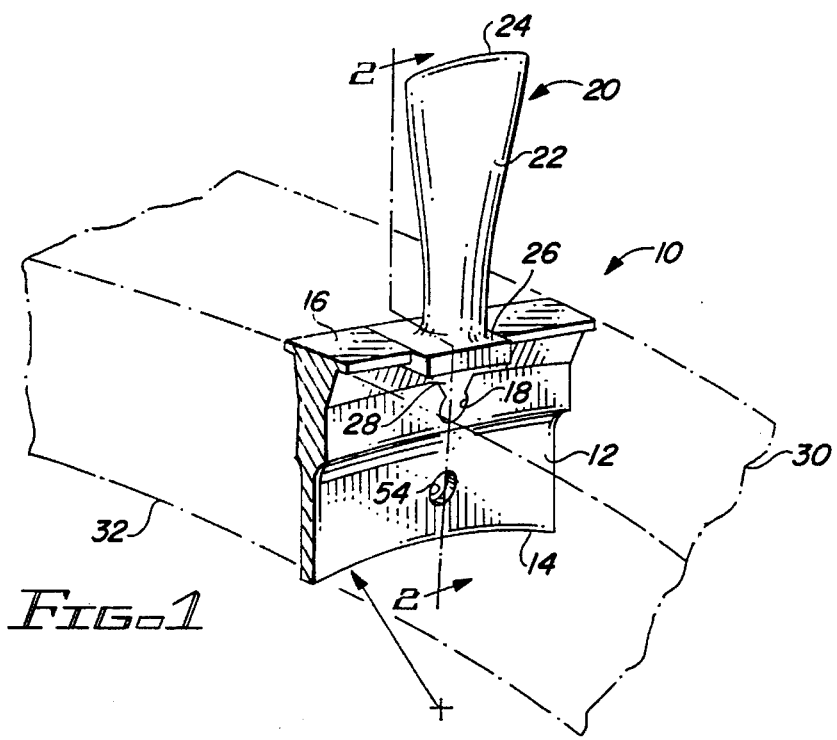
FIG. 1 is a partial perspective view of a segment of a compressor or turbine wheel with the blades mounted thereon.

Referring now more particularly to the drawings, a typical axial turbine or compressor wheel is generally denoted by the numeral 10 and includes a central rotor 12 having a central through bore 14, an outer periphery 16, and a plurality of dovetail configured grooves 18 extending axially through the rotor and disposed generally near the periphery 16. Compressor or turbine blades 20 are carried upon the outer periphery of the rotor 14. Each compressor or turbine blade 20 includes a radially upstanding airfoil 22 having an outer tip 24, a platform 26, and a root portion 28 which is complementary contoured to be received within the dovetail groove 18. Each blade 22 is assembled upon rotor 12 by insertion axially into the dovetail groove 18. The dovetail configuration of groove 18 radially secures the blade, but in the position illustrated is relatively loosely mounted therein. Loose mounting is necessary not only to facilitate assembly, but also to allow for necessary tolerances because of differential thermodynamic responses between the blade and rotor during the operation of the wheel.

As so mounted upon the rotor 12, the blades 20 are not necessarily disposed in the "running" location, i.e. the positions the blades take while spinning within the gas turbine engine. Further, the diameter of each of the tips 24 relative to the center of the rotor 12 varies due to manufacturing tolerance buildups.

Figure 2:
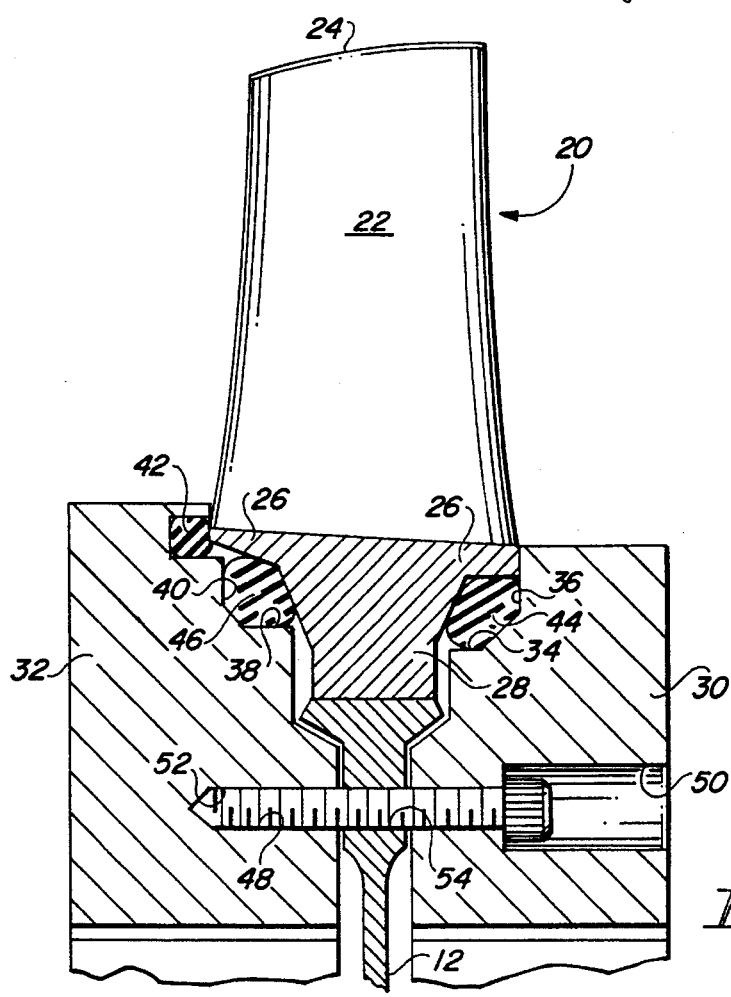
FIG. 2 is an elevational cross-sectional view of the arrangement illustrated in FIG. 1 and showing the fixturing members for locating the blades in their "running" positions.

As clearly illustrated in FIG. 2 the present invention contemplates a first ring fixture 32 which is disposed axially on one side of the rotor 12 and associated blades 20. This first ring fixture 30 is denoted as being on the "forward" axial side of the wheel for reference purposes herein. A second, similar ring fixture 32 is disposed on the opposite "aft" axial side of the rotor 12 and blades 20. Each of the ring fixtures 30, 32 have a plurality of stepped faces which are disposed toward the opposite axial sides of the blades 20 and rotor 12. For example, fixture 30 has an axially extending wall 34 and a radially extending wall 36 disposed adjacent the portion of platform 26 which protrudes axially forwardly from the rotor 12. Similarly, fixture 32 has an axially extending circular wall 38 and a radially extending circular wall 40 which face the portion of platform 26 which protrudes in an aft direction from the rotor 12. The second fixture 32 further preferably includes another groove which receives a resilient elastomer 42.

Importantly, the present invention contemplates resilient biasing members in the form of annular o-rings 44, 46 which may be of circular cross-section. O-ring 44 is disposed between walls 34, 36 and the forwardly protruding portion of platform 26. O-ring 46 is disposed between walls 38, 40 and the aft protruding portion of platform 26. The fixture in FIG. 2 further includes a plurality of bolts 48 received through aligned openings 50, 52 in the fixtures 30 and 32 for intersecurement thereof. Each bolt 48 passes loosely through an associated hole 54 in the rotor 12.

When so assembled as illustrated in FIG. 2, the axial intersecurement affected by tightening of bolts 48 causes squeezing of the o-rings 36 and 46 in the grooves in which they are received. This creates axial and radial forces on each of the blades 20 to uniformly radially urge each of the blades outwardly to the "running position" that the blades will subsequently assume during operation of the wheel in a gas turbine engine. Additionally, the resilient elastomeric member 42 acts upon the aft protruding portion of platform 26 to urge each of the blades 22 axially against the radial face 36 of the first fixture 30. Radial face 36 is premachined to act as a datum face such that when the blades are urged against this datum they assume their "running" axial position relative to the rotor 12.

In this manner, the axial compression and intersecurement of the two ring fixtures 30 and 32 creates a generally uniform radial outward pressure on all of the blades 20 to securely hold them in their "running" position. This uniform radial force prevents blade cocking.

Figure 3:
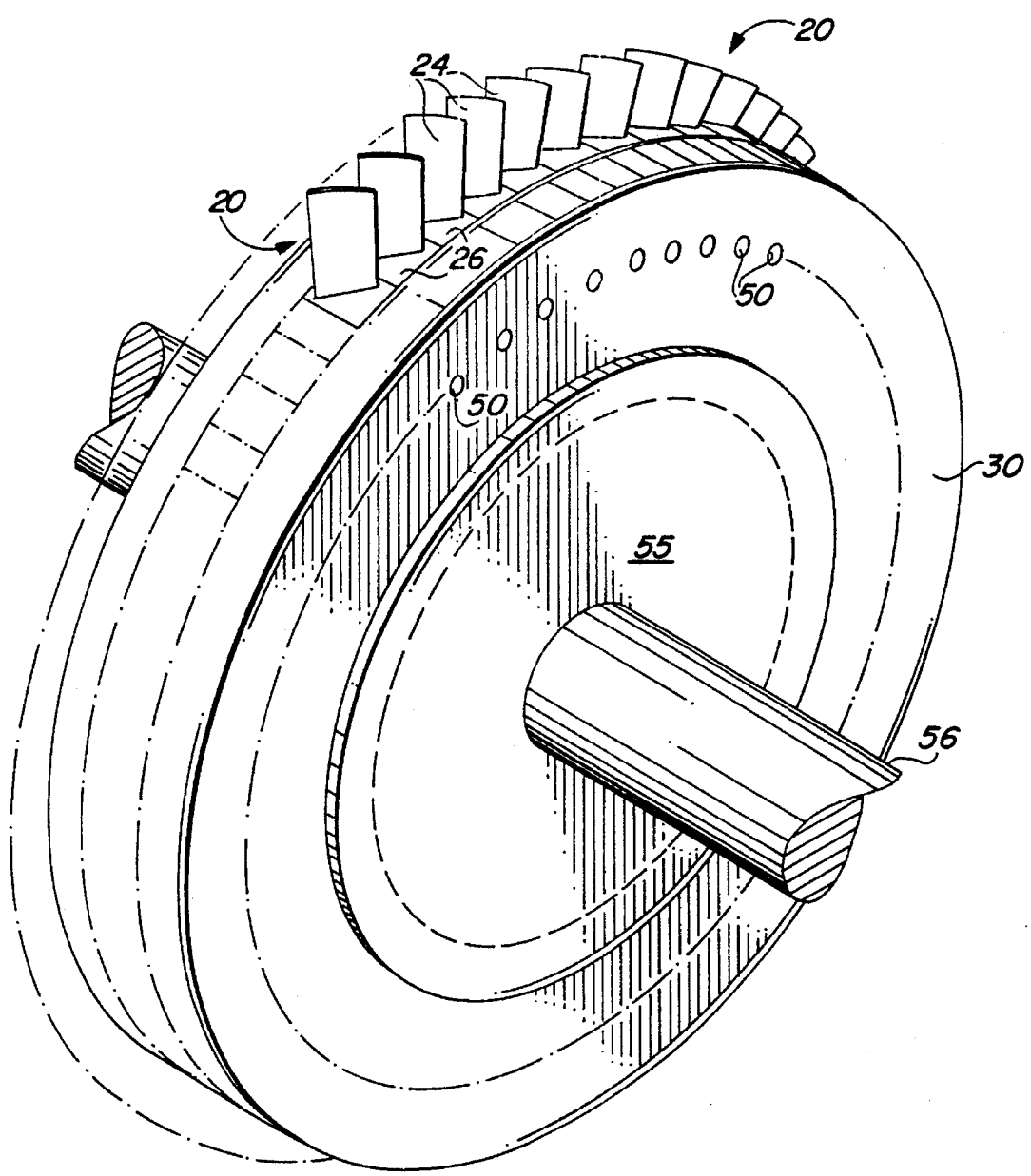
FIG. 3 is a perspective illustration of the assembled blades, rotor and assembly fixtures as mounted upon a portion of a lathe for machining.

Since the blades 20 are now securely held in their "running" positions upon the rotor 12, the entire subassembly with fixtures may now be utilized for true tip machining of the blade tips 24. More particularly the blades 20, as assembled on to rotor 12 with the fixtures 30, 32 and bolts 52 all intersecured, may be affixed as a unit on a lathe as illustrated in FIG. 3. In FIG. 3 a lathe fixture 55 and portion of associated spindle 56 rotatably mounts the subassembly on the normal rotational axis of the wheel 10. By conventional lathe grinding and cutting, during spinning of the assembly illustrated in FIG. 3, the tips 24 of all of the blades 20 may be machined to the desired outer true diameter in a single, unified operation.

From the foregoing it will be apparent that the present invention contemplates an improved method of machining compressor or turbine blade outer diameters or blade tips 24 which includes the step of loosely assembling the annular array of blades 20 on the outer periphery of the rotor with platform portions 26 of each of the blades 20 protruding axially forwardly and aft from opposite sides of the rotor 12. Ring fixtures 30, 32 are mounted to opposite sides of rotor 12 and axially intersecured to one another by bolts 48 so as to axially fix and locate blades 20 by urging them against the datum provided by face 36 on fixture 30. A generally circumferentially uniform, radially outward force is then applied to the protruding portions of platforms 26 of each of the blades so as to radially position and fix all of the blades 20. Subsequently, the outer tips 24 may be machined with the blades 50 fixed in both a radial and axial direction.

The foregoing detailed description of the preferred arrangement of the invention should be considered exemplary in nature and not as limited to the scope and spirit of the invention as set forth in the appended claims.

Having described the invention with sufficient clarity that those skilled in the art may make and use it, what is claimed is:

1. An assembly fixture for securely positioning compressor or turbine blades loosely assembled onto a rotor to simulate actual positioning when subsequently assembled into a gas turbine engine, comprising:

a first annular ring fixture disposed on one axial side of the rotor and blades, said first ring fixture having annular radial and axial walls facing but spaced from a first portion of each of the blades protruding axially from the rotor;

a first annular resilient biasing member contacting said radial and axial walls of the first fixture and said first portions of the blades;

a second annular ring fixture disposed on an opposite axial side of the rotor and blades, said first ring fixture having annular radial and axial walls facing but spaced from a second portion of each of the blades protruding axially from the rotor;

a second annular resilient biasing member contacting said radial and axial walls of the second fixture and said second portions of the blades; and means for axially clamping said first and second ring fixtures together and thereupon compressing both said first and second biasing members to urge said blades radially relative to said rotor to simulate actual assembled positions in the engine.

2. A fixture as set forth in claim 1, wherein each of said first and second biasing members is an annular elastomeric o-ring.

3. A fixture as set forth in claim 1, further including a third biasing member extending between said second ring fixture and said second portions of the blades for urging said first portions of the blades into axial engagement with a radially extending axial locating face on said first ring fixture.

4. A fixture as set forth in claim 3, wherein said third biasing member is of annular configuration and is comprised of a compressible elastomeric material.

\* \* \* \* \*